(12) United States Patent
Knight

(10) Patent No.: US 7,004,603 B2
(45) Date of Patent: Feb. 28, 2006

(54) ANGLE ADJUSTMENT DEVICE

(76) Inventor: Richard Knight, 29 Leybourne Avenue Bournemouth, Dorset (GB), BH10 6ES ( * ) Notice: Subject to any disclaimer, the term of this patent is extended or adjusted under 35 U.S.C. 154(b) by 26 days.

(21) Appl. No.: 10/043,214

(22) Filed: Jan. 14, 2002

(65) Prior Publication Data

US 2002/0060910 A1 May 23, 2002

Related U.S. Application Data

(62) Division of application No. 09/544,466, filed on Apr. 7, 2000, now Pat. No. 6,390,643.

(51) Int. Cl.
F21V 21/14 (2006.01)

(52) U.S. Cl. .................. 362/250; 362/271; 362/287; 362/428; 362/800

(58) Field of Classification Search ............... 362/259, 362/270, 271, 287, 239, 250, 427, 428, 800, 362/269, 249, 252, 231, 209, 233
See application file for complete search history.

(56) References Cited

U.S. PATENT DOCUMENTS

| 4,025,777 A | 5/1977 | Hayakawa | 362/250 |
|---|---|---|---|
| 4,264,845 A | * 4/1981 | Bednarz | 362/800 |
| 5,155,669 A | * 10/1992 | Yamuro | 362/252 |
| 5,513,085 A | 4/1996 | Bourne | |
| 5,595,441 A | * 1/1997 | McGee | 362/250 |
| 5,752,766 A | 5/1998 | Bailey et al. | 362/250 |
| 6,132,063 A | 10/2000 | Byers | 362/252 |
| 6,390,643 B1 | * 5/2002 | Knight | 362/250 |

FOREIGN PATENT DOCUMENTS

| DE | 297 05 519 | | 7/1997 |
|---|---|---|---|
| GB | 2 307 765 | | 6/1997 |
| GB | 2342435 A | * | 4/2000 |
| GB | 2362207 A | * | 11/2001 |
| JP | 3-172999 | | 7/1991 |
| JP | 10-165423 | | 6/1998 |

* cited by examiner

Primary Examiner—Stephen F Husar
(74) Attorney, Agent, or Firm—Fortkort Grether +Kelton LLP

(57) ABSTRACT

An angle adjustment device comprises a support member, a plurality of holders for light emitting or receiving devices, each holder being supported by the support member for pivoting about at least one axis and an elongate spiral element which co-operates with the holders so that when the spiral element is displaced angularly about its axis relative to the support member, each holder pivots about its said at least one axis.

32 Claims, 6 Drawing Sheets

ANGLE ADJUSTMENT DEVICE

This application is a division of application Ser. No. 09/544,466, filed on Apr. 7, 2000 now U.S. Pat. No. 6,390,643, the entire contents of which are hereby incorporated by reference.

INTRODUCTION

This invention relates to an angle adjustment device and more particularly but not exclusively to such a device for changing a beam of light produced by a plurality of light emitting devices, such as light emitting diodes or fibre optics. Such a device has particular application in automated lighting.

SUMMARY OF THE INVENTION

According to one aspect of the present invention there is provided an angle adjustment device comprising a support member, a plurality of holders for light emitting or receiving devices, each holder being supported by the support member for pivotable movement about at least one axis, and an elongate spiral element which co-operates with the holders so that when the spiral element is displaced angularly about its axis relative to the support member, each holder pivots about its said at least one axis.

Preferably, said at least one axis of each holder extends perpendicularly or substantially perpendicularly to a radius extending outwardly from the axis of the spiral and through the holder.

Preferably, the spiral element passes through an aperture in each holder or in a part connected to each holder and is slidable relative to each holder when displaced angularly.

Preferably, means (typically an electric motor) is provided for angularly displacing the spiral element about its axis.

Preferably, the holders are spaced apart on the support member along a spiral path. Alternatively, the holders may be spaced apart on the support member in concentric circles.

Advantageously, each holder is connected to the support member by a universal joint. In this case, one or more angularly displaceable members may be connected to the holders so that when the angularly displaceable member(s) is/are displaced angularly relative to the support member, each holder pivots about a second axis extending perpendicularly or substantially perpendicularly to said one axis. The angularly displaceable member(s) is/are typically in the form of a further spiral or a plurality of spokes extending radially outwards from the axis of the first mentioned spiral. Means (typically a second electric motor) may be provided for angularly displacing the angularly displaceable member(s) relative to the support member.

The angle adjustment device may also comprise a plurality of light emitting devices supported by the holders. The light emitting devices are preferably in the form of light emitting diodes (LED's) and typically in for form of white LED's each having red, blue and green guns, but they could be in the form of fibre optics.

The support member may be capable of flexing and means (typically a third electric motor) may be provided for flexing the support member between a planar condition and a bowl-shaped and/or dome-shaped condition.

According to a further aspect of the invention there is provided automated lighting having a source of light formed by a plurality of white light emitting diodes.

The invention will now be more particularly described, by way of example, with reference to the accompanying drawings.

DESCRIPTION OF THE PREFERRED EMBODIMENT

Figure 1:
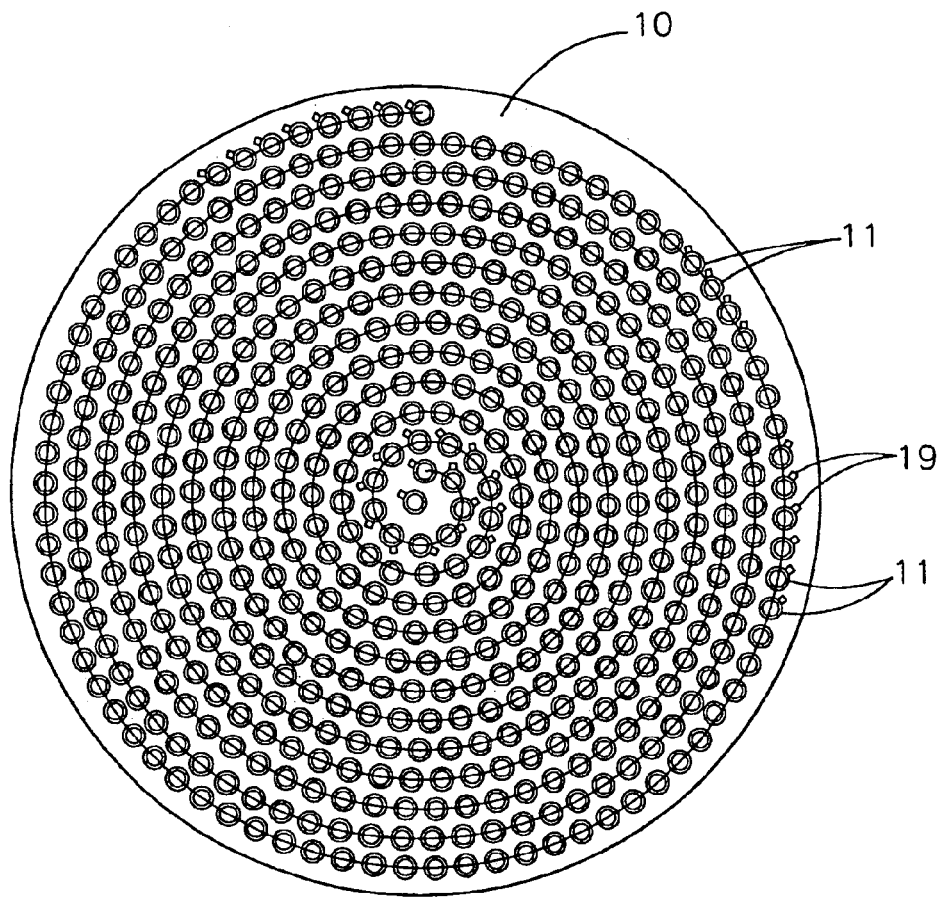
FIG. 1 is a plan view of one embodiment of an angle adjustment device according to the invention.
Figure 2:
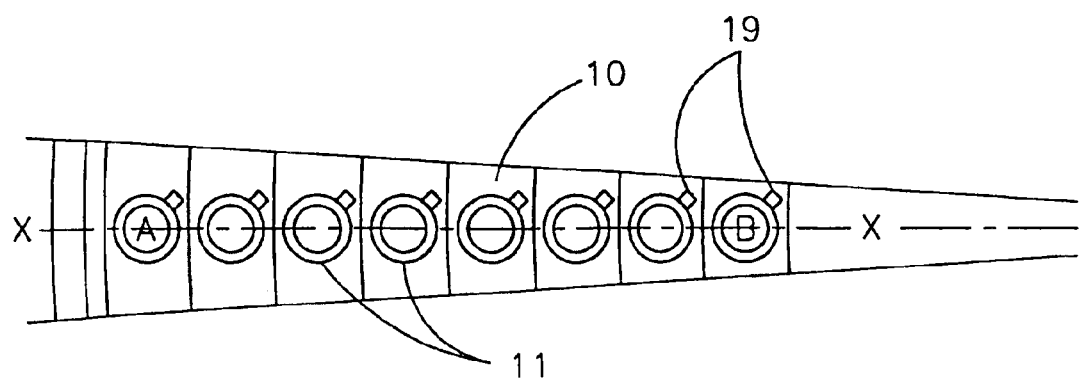
FIG. 2 is a fragmentary plan view of part of the angle adjustment device of FIG. 1 on an enlarged scale.
Figure 3:
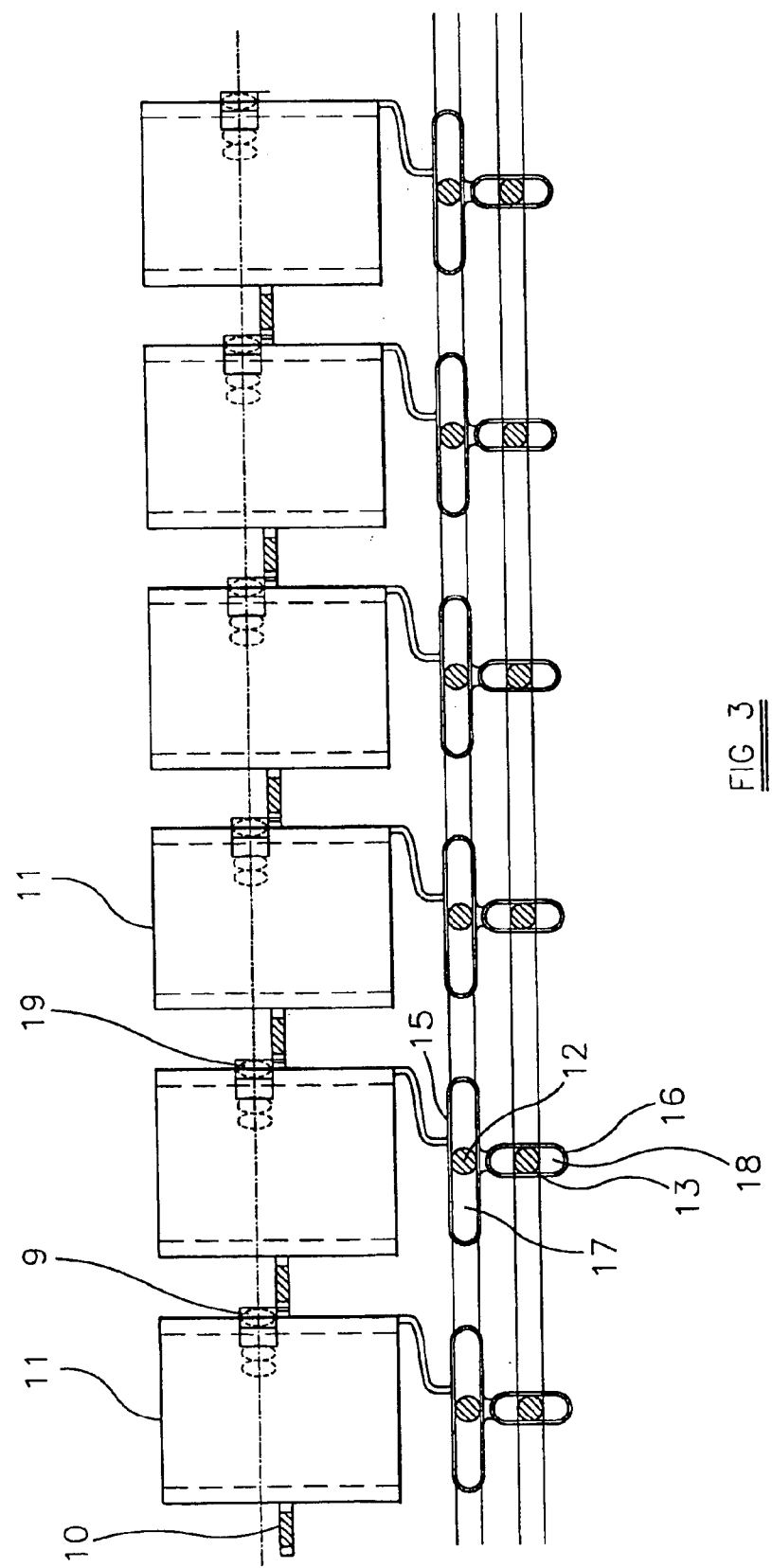
FIG. 3 is a section taken along the line X—X of FIG. 2 on a much enlarged scale.

Referring firstly to FIGS. 1 to 8 of the drawings, the angle adjustment device shown therein comprises a support member 10, a plurality of LED holders 11 supported by the support member 10 and two spiral elements 12 and 13.

The support member 10 is in the form of a tightly wound spiral which is punched out of sheet material, typically plastics material or an aluminium alloy, and which is capable of flexing for a purpose which will become apparent hereinafter. The support member 10 is mounted in a retaining bowl 14 and has its outer peripheral edge secured to the lip of the bowl 14.

The LED holders 11 are connected to the support member 10 by universal joints 19 so that the holders 11 can pivot relative to the support member 10.

Each holder 11 has two eyelets 15 and 16. The eyelet 15 has an elongate horizontally extending slot 17 and the eyelet 16 has an elongate vertically extending slot 18.

Figure 7:
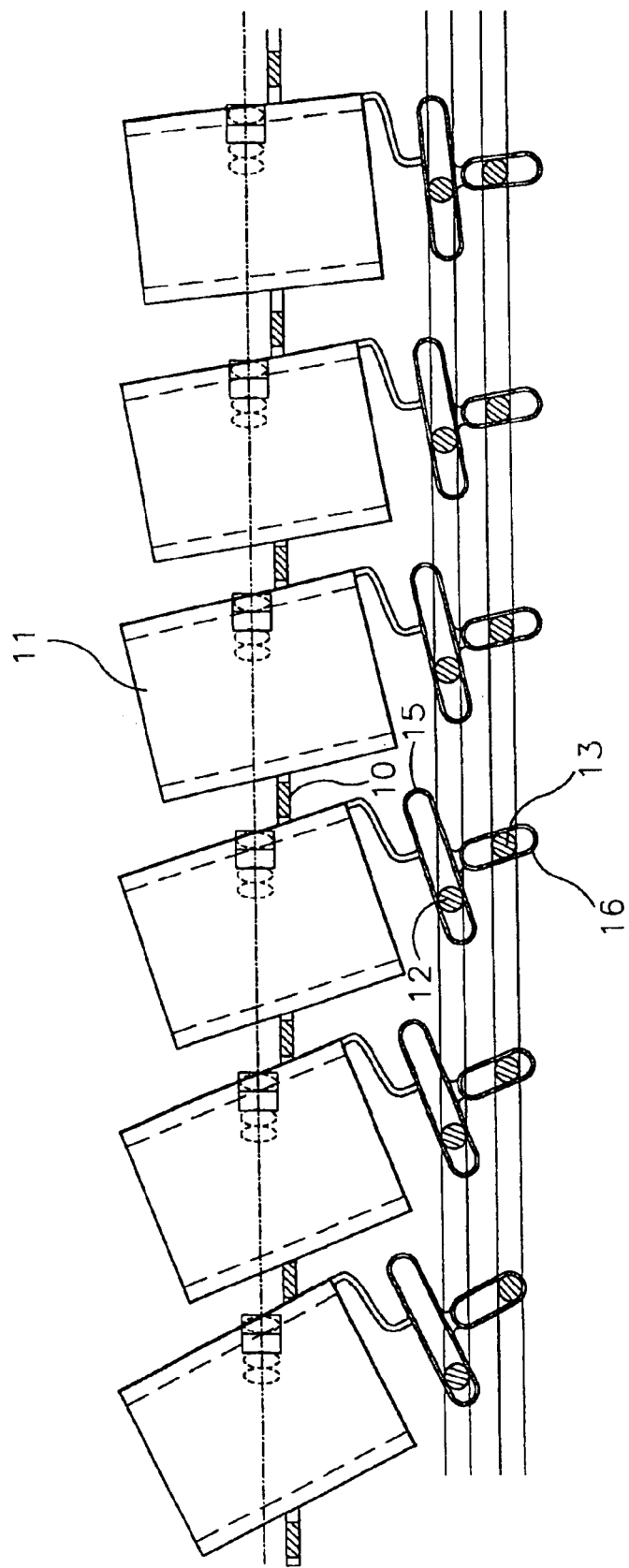
FIG. 7 is a side view showing the holders deflected about an axis perpendicular to the radially extending axis.
Figure 8:
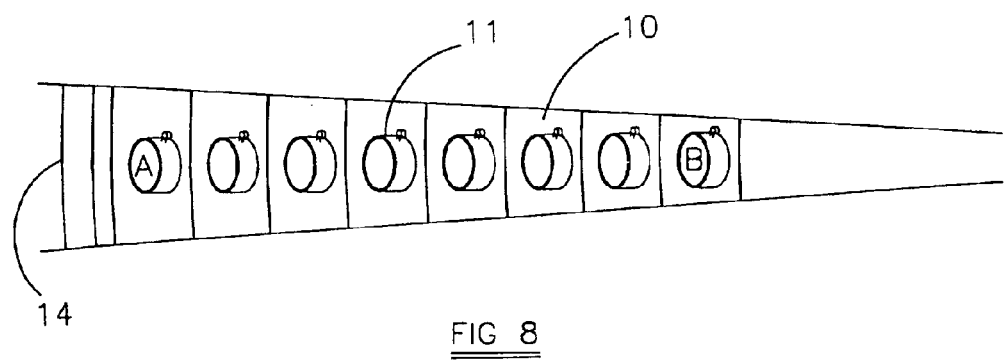
FIG. 8 is a plan view similar to FIG. 2 but showing the holders deflected about the axis perpendicular to the radially extending axis.

The first and second elongate spiral elements 12 and 13, typically formed from relatively rigid wire, are wound through the eyelets 15 and 16, respectively. The spiral element 13 is not attached to the eyelets 16 but is slidable relative thereto and is rotatable relative to the support member 10 by an electric motor (not shown). Rotation of the spiral element 13 will move the eyelets 16 radially inwards or radially outwards depending on the direction of rotation of the spiral element 13 and this will cause the holders 11 to tilt as shown in FIGS. 7 and 8. If the spacing between all turns of the spiral is equal and if the outer end of the spiral element 13 is free and allowed to wind into and out of a guide slot located around the inside of the bowl 14, all holders 11 will be deflected by equal amounts. If the outer end of the spiral element 13 is clamped or driven by a motor at a different speed from the inner end, rotation of the spiral element 13 at the centre will cause unequal deflection of the inner and outer holders 11. Assuming a clockwise wound spiral element 13, clamping the outer edge of the spiral whilst the centre of the spiral element is rotated in an anti-clockwise direction will result in an increase in the spacing between the outer turns of the spiral element 13 and a tightening of the inner coils. The outer holders will then deflect more than the inner holders. If the spiral element 13 is wound so that the spacing between turns increases as it winds outwards, the outer holders will deflect more than the inner holders. Conversely, if the spiral element 13 is wound so that the spacing between turns decreases as it winds outwards, the inner holders will deflect more than the outer holders.

Figure 4:
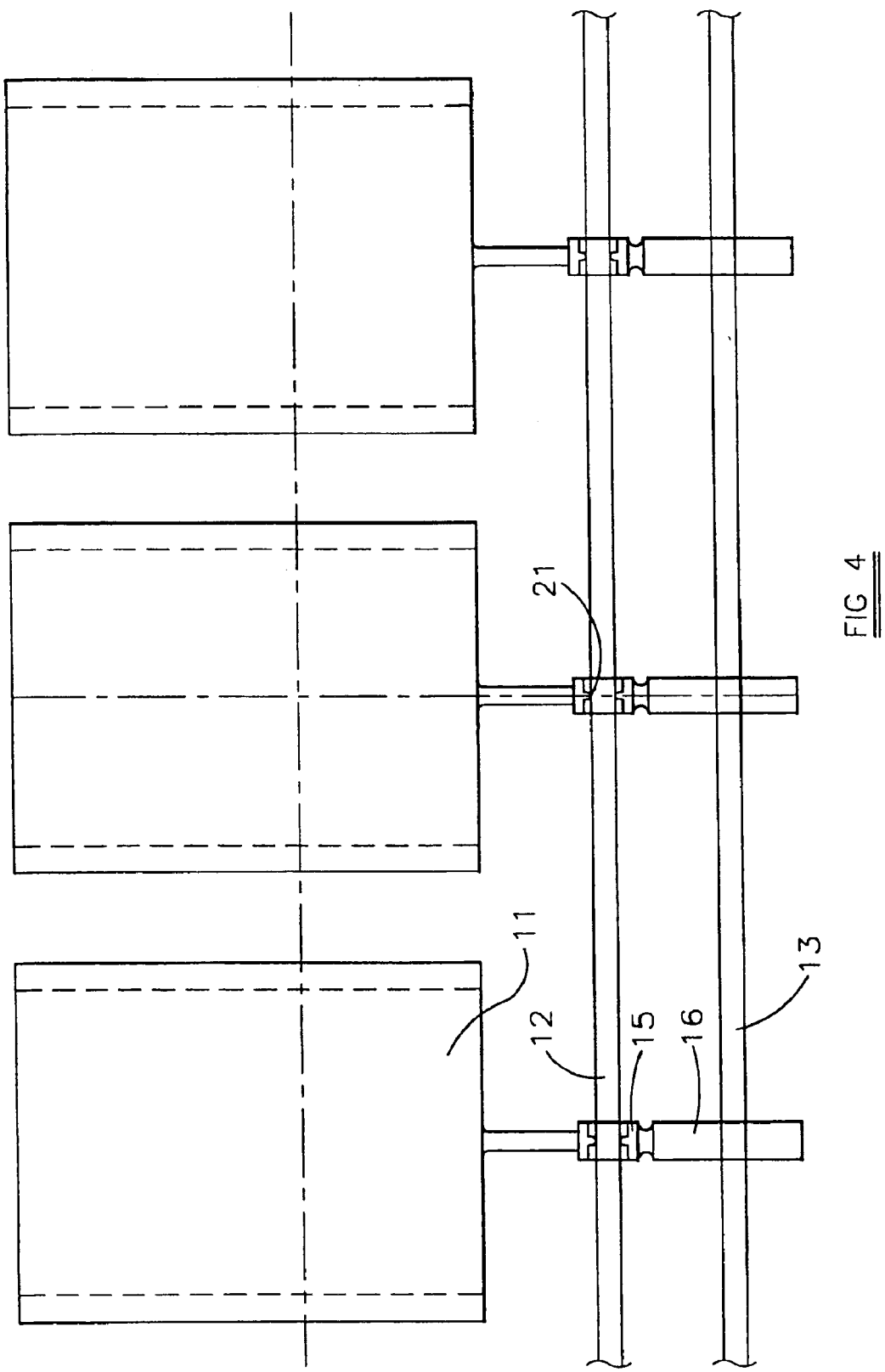
FIG. 4 is a view generally at right angles to the view of FIG. 3.
Figure 5:
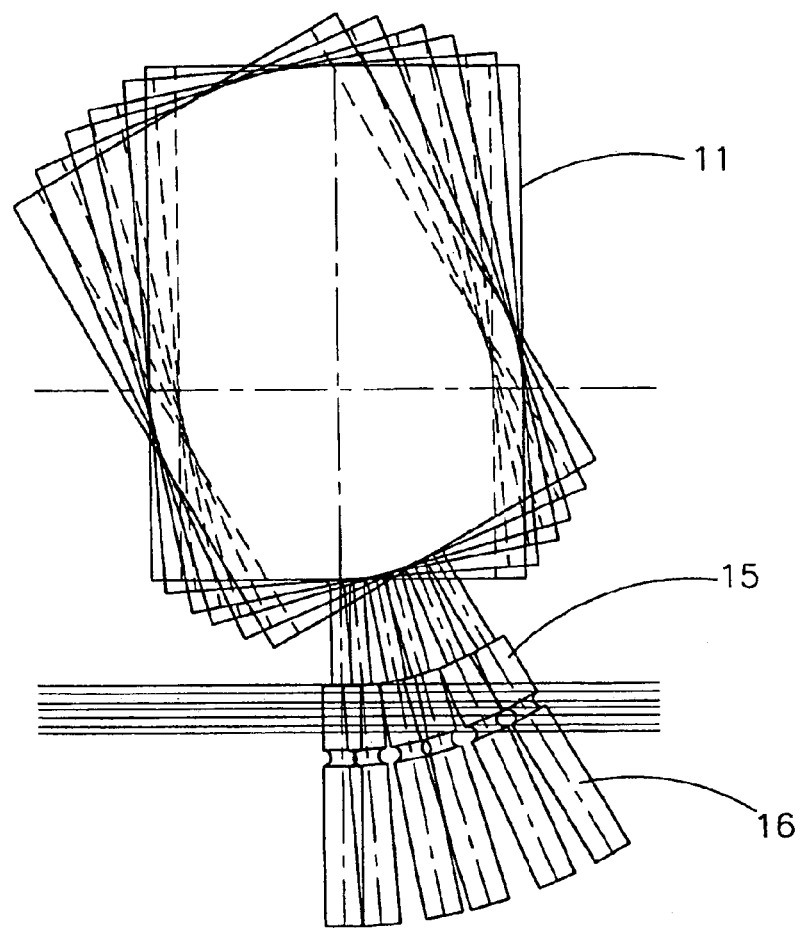
FIG. 5 is a side view showing the manner in which a holder is deflected about a radially outwardly extending axis.
Figure 6:
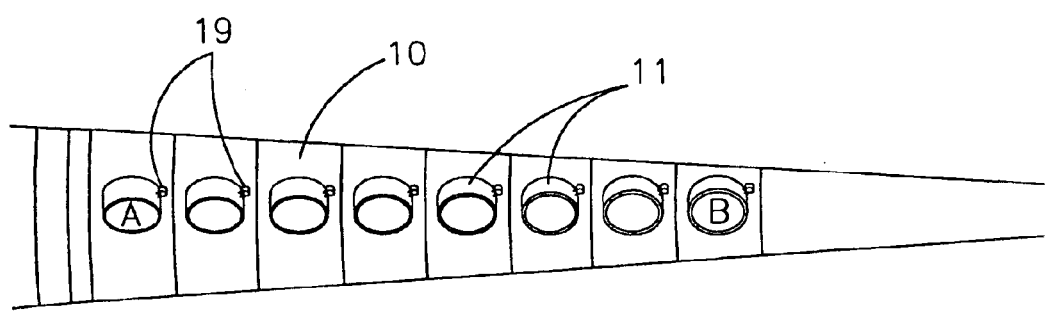
FIG. 6 is a plan view similar to FIG. 2 but showing the holders deflected about the radially extending axis.

The spiral element 12 is held captive with respect to the eyelets 15 of each holder 11 so that the spiral element 19 can slide along the slot 17 but cannot slide relative to the eyelet in the direction of the longitudinal extent of the spiral. This can be done as shown in FIG. 4 by providing indents 21 in the spiral element 12 in which the eyelet 15 engages or by collars or washers (not shown) fixed to the spiral element 12 on opposite sides of the eyelet 15. The spiral element 12 is angularly displaceable relative to the support member 10 by a second electric motor (not shown). Such angular movement of the spiral element 19 will cause the holders 11 to tilt about a radially extending axis as shown in FIGS. 5 and 6.

The spiral elements 12 and 13 can be displaced by their respective motors at the same time.

The eyelets 15 and 16 (and the spiral elements 19 and 20) could be interchanged so that the top spiral element causes deflection about an axis at right angles to a radius and the bottom spiral element produces deflection about a radially extending axis.

A third electric motor (not shown) could be provided to push the support member 10, together with the spiral elements 12 and 13, from the planar condition shown in the drawings into a dome-shaped condition or to pull the support member 10, together with the spiral elements 12 and 13, into a bowl-shaped condition. It is for this reason that the support member 10 is formed so as to be capable of flexing.

In a preferred embodiment the holders 11 support white LED's each having blue red and green guns. They could however support fibre optics or lenses or light sensitive devices.

Figure 9:
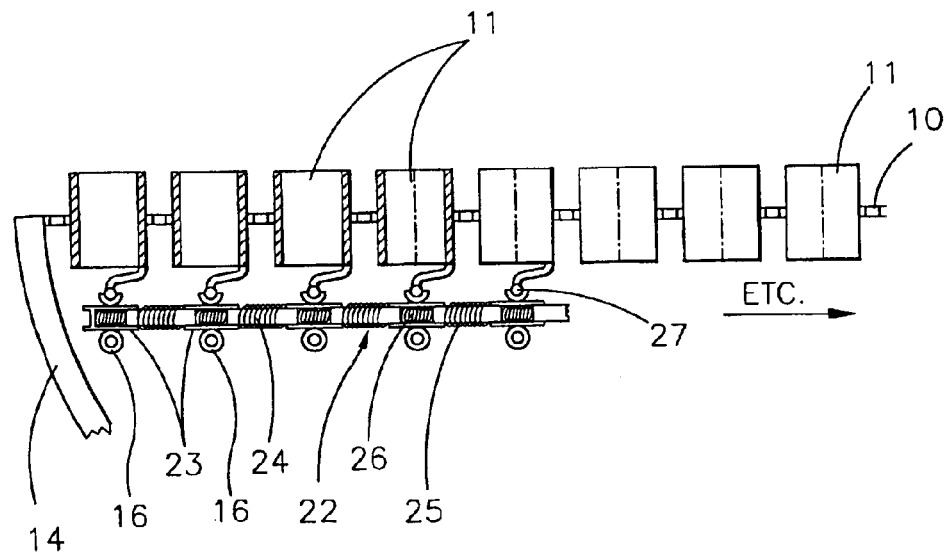
FIG. 9 is a view similar to FIG. 3 of another embodiment of an angle adjustment device according to the invention.

Referring now to FIG. 9 of the drawings, the spiral element 12 is replaced by spokes 22. The spokes 22 are telescopically extendible and are located below the support member 10. The spokes 22 extend radially outwards from the axis of the spiral support member 10 and are equi-angularly spaced. Each spoke 22 comprises a plurality of sleeve-like parts 23 and a plurality of rod-like parts 24 each of which is slidably mounted in two adjacent sleeve-like parts 23 thus permitting the spokes 22 to extend and retract. The sleeve-like parts 23 are interconnected by springs 25 and the rod-like parts 24 are interconnected by springs 26. Each holder 11 may be connected to one of the sleeve-like parts 23 by a further universal joint 27.

The spokes 22 are angularly displaceable relative to the support member 10 by an electric motor (not shown). Such angular movement of the spokes 22 will cause the holders 11 to tilt about a radially extending axis as shown in FIGS. 5 and 6. The holders 11 closer to the outer periphery of the support member 10 will tilt more than the holders 11 closer to the inner periphery of the support member 10 and this will change the angle and shape of the light beam emitted by LED's supported in the holders 11.

The motors can be operated in accordance with a computer program so that the angle adjustment device varies the lighting as required.

The angle adjustment devices described above are particularly suitable for use in automated lighting although they could have other applications.

The embodiments described above are given by way of example and various modifications will be apparent to a person skilled in the art without departing from the scope of the invention. For example, the spokes 22 or second spiral element 12 could be omitted. In this case, the holders 11 could not be tilted as shown in FIGS. 5 and 6 but could still be tilted as shown in FIGS. 7 and 8. Also, the support member 10 may not be capable of flexing and may instead be of fixed planar shape or of fixed dome-like or bowl-like shape.

What is claimed is:

1. Automated lighting having a source of light formed by a plurality of light emitting diodes (LEDs) that are pivotably mounted on a support member with a universal joint so that said LEDs are adjustable to change at least one of an angle and a shape of a light beam produced by said LEDs.

2. The lighting of claim 1, wherein each of said LEDs comprises red, blue and green guns.

3. The lighting of claim 1, wherein said support member is planar.

4. The lighting of claim 1, wherein said support member is non-planar.

5. The lighting of claim 1, wherein each of said support member is movable between a planar and a non-planar configuration.

6. The lighting of claim 1, wherein each of said LEDs is pivotable in directions that are at right angles to each other.

7. The lighting of claim 1 wherein adjustment of said LEDs is performed by an electric motor.

8. The lighting of claim 1, wherein adjustment of said LEDs emit white light.

9. A lighting apparatus, comprising:
a support; and plural light emitting diodes (LEDs) that are each pivotably mounted on said support with a universal joint and that together form a source of light.

10. The lighting apparatus of claim 9, wherein said support is movable between a planar and non-planar configuration.

11. The lighting apparatus of claim 9, wherein the source of light is a white light.

12. The lighting apparatus of claim 9, further comprising at least two elongated elements that are attached to said LEDs and that are movable and cause pivotal motion of said LEDs.

13. The lighting apparatus of claim 9, wherein each of said LEDs is pivotable in directions that are at right angles to each other.

14. A lighting apparatus, comprising:
a support;
plural light emitting diodes (LEDs) that are each pivotably mounted on said support and that together form a source of light; and
elongated elements attached to said LEDs that are movable and cause pivotal motion of said LEDs.

15. The lighting apparatus of claim 14, wherein said support is movable between a planar and non-planar configuration.

16. The lighting apparatus of claim 14, wherein each of said LEDs is attached to said support with a universal joint.

17. The lighting apparatus of claim 14, wherein the source of light is a white light.

18. The lighting apparatus of claim 14, wherein each of said LEDs is pivotable in directions that are at right angles to each other.

19. Automated lighting having a source of light formed by a plurality of light emitting diodes (LEDs) that are pivotably mounted on a support.

20. The lighting apparatus of claim 19, wherein said LEDs are attached to said support with a joint.

21. The lighting apparatus of claim 19, wherein the source of light is a white light.

22. The lighting apparatus of claim 19, further comprising at least two elongated elements that are attached to said LEDs and that are movable and cause pivotal motion of said LEDs.

23. The lighting apparatus of claim 19, wherein said LEDs are pivotable in directions that are at right angles to each other.

24. The lighting apparatus of claim 19, wherein the apparatus has a center axis and said LEDs are pivotable in directions that are at right angles to the center axis of the apparatus.

25. The lighting apparatus of claim 19, wherein the apparatus has a center axis and said LEDs is pivotable in directions in-line with the center axis of the apparatus.

26. The lighting apparatus of claim 19, wherein the pivoting of the LEDs results in modification of the width of the light beam formed by the LEDs.

27. The lighting apparatus of claim 19, wherein the pivoting of the LEDs results in modification of the direction of the light beam formed by the LEDs.

28. A lighting apparatus comprising a plurality of light emitting diodes (LEDs) that are pivotably mounted on support to form a light beam whose characteristics change as the LEDs are pivoted.

29. The lighting apparatus of claim 28 where a characteristic of the light beam that changes as the LEDs pivot is the height of the beam.

30. The lighting apparatus of claim 28 where a characteristic of the light beam that changes as the LEDs pivot is the direction of the light beam.

31. The lighting apparatus of claim 28 where the light beam width and/or direction change as the LEDs pivot.

32. The lighting apparatus of claim 28 where the light beam height and/or width and/or direction change as the LEDs pivot.

* * * * *